United States Patent
Tajika et al.

(10) Patent No.: US 9,950,283 B2
(45) Date of Patent: Apr. 24, 2018

(54) SUPERNATANT WATER DISCHARGE DEVICE

(71) Applicant: SUMITOMO METAL MINING CO., LTD., Tokyo (JP)

(72) Inventors: Masahide Tajika, Tokyo (JP); Yoshiharu Nagamoto, Tokyo (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 14/909,999

(22) PCT Filed: Jan. 21, 2015

(86) PCT No.: PCT/JP2015/051509
§ 371 (c)(1),
(2) Date: Feb. 4, 2016

(87) PCT Pub. No.: WO2015/156009
PCT Pub. Date: Oct. 15, 2015

(65) Prior Publication Data
US 2016/0184742 A1 Jun. 30, 2016

(30) Foreign Application Priority Data

Apr. 11, 2014 (JP) ................ 2014-081529

(51) Int. Cl.
*B01D 35/00* (2006.01)
*B01D 21/24* (2006.01)
(Continued)

(52) U.S. Cl.
CPC ..... *B01D 21/2444* (2013.01); *B01D 21/0018* (2013.01); *B01D 21/2427* (2013.01); *B01D 21/30* (2013.01); *B01D 21/307* (2013.01); *B01D 21/34* (2013.01); *F04D 15/00* (2013.01)

(58) Field of Classification Search
None
See application file for complete search history.

(56) References Cited

U.S. PATENT DOCUMENTS 3,844,946 A * 10/1974 Farrell, Jr. ......... B01D 21/0018
210/104
4,738,549 A * 4/1988 Plimpton ................. G01K 1/08
349/162

(Continued)

FOREIGN PATENT DOCUMENTS

JP S54-94753 7/1979
JP S63-78198 U 5/1988
(Continued)

OTHER PUBLICATIONS

International Search Report for International Application No. PCT/JP2015/051509 dated Mar. 24, 2015.
(Continued)

*Primary Examiner* — Richard C Gurtowski
(74) *Attorney, Agent, or Firm* — Kratz, Quintos & Hanson, LLP (57) ABSTRACT

To provide a supernatant water discharge device capable of preventing overflow from a settling pond due to severe rain. The supernatant water discharge device comprises: a submersible pump 10 provided in a first settling pond D; a floating member 30 that makes the submersible pump 10 float on a water surface; a distance sensor 41 that measures a distance to a sediment S; an anemometer 42; and a controller 50 that stops the submersible pump 10 if a measured value from the distance sensor 41 or the anemometer 42 reaches a threshold. By predicting severe rain, discharge of supernatant water W to a second settling pond P can be stopped. This can prevent overflow from the second settling pond P due to severe rain. If the sediment S gets close to the submersible pump 10 as a result of a drop in (Continued)

water level or increase in a deposition height, the submersible pump 10 can be stopped. This can prevent failure of the submersible pump 10 due to suction of a solid.

3 Claims, 4 Drawing Sheets

(51) Int. Cl.
*B01D 21/30* (2006.01)
*F04D 15/00* (2006.01)
*B01D 21/34* (2006.01)
*B01D 21/00* (2006.01)

(56) References Cited

U.S. PATENT DOCUMENTS

| | | | | |
|---|---|---|---|---|
| 4,896,534 A | * | 1/1990 | Daly | G01F 1/22 |
| | | | | 73/170.03 |
| 5,591,010 A | * | 1/1997 | Van Zyl | G05D 9/12 |
| | | | | 417/12 |
| 2002/0084227 A1 | * | 7/2002 | Sower | C02F 11/20 |
| | | | | 210/739 |
| 2005/0109702 A1 | | 5/2005 | Dwyer | |

FOREIGN PATENT DOCUMENTS

| | | |
|---|---|---|
| JP | H01-88798 U | 6/1989 |
| JP | H11-123395 | 5/1999 |
| JP | 2000-9039 | 1/2000 |
| JP | 2000-129644 | 5/2000 |
| JP | 2001-137835 A1 | 5/2001 |
| JP | 2001-304171 A1 | 10/2001 |
| JP | 2007-512124 A1 | 5/2007 |
| JP | 2009-197669 A1 | 9/2009 |
| JP | 2010-48020 A1 | 3/2010 |
| JP | 2013-181893 A1 | 9/2013 |

OTHER PUBLICATIONS

International Preliminary Report on Patentability for International Application No. PCT/JP2015/051509 dated May 8, 2015.

* cited by examiner

SUPERNATANT WATER DISCHARGE DEVICE

TECHNICAL FIELD

This invention relates to a supernatant water discharge device. More specifically, this invention relates to a supernatant water discharge device for discharging supernatant water in a tailings dam to a return water pond, for example.

BACKGROUND ART

High-temperature and pressure sulfuric acid leaching corresponding to high pressure acid leaching (HPAL) using sulfuric acid is known as a hydrometallurgy method to recover a valuable metal such as nickel or cobalt from a low-grade nickel oxide ore represented by a limonite ore, for example.

According to hydrometallurgy employing high-temperature and pressure sulfuric acid leaching, slurry produced during a manufacturing process to be discharged to the outside of a system is treated in a large-scale settling pond such as a tailings dam (slag dam). In the tailings dam, a solid in the slurry settles out using gravity and is deposited on the bottom of the dam. Supernatant water in the tailings dam is discharged to a return water pond (still pond), placed at a standstill therein, and then discharged to the outside of the system.

A thickener is known as a device for treating slurry. The thickener includes a thickener body and a rake to rotate inside the thickener body. The thickener body has a cylindrical outer frame and a conical bottom recessed deeply at the center. A solid in slurry supplied to the thickener body is flocculated, precipitated, and compressed through addition of a flocculant, gravitational settling, and agitating action by the rake. Then, the solid is deposited on the bottom. The solid is extracted from the bottom and supernatant water is extracted through an overflow line. The slurry can be treated efficiently within a relatively short period of time using the thickener.

According to hydrometallurgy using a low-grade nickel oxide ore (containing nickel of about 1% by weight in terms of grade) as a raw material, most treated ore is discharged. Thus, slurry is produced in a large quantity to result in a large quantity of supernatant water being discharged. Thus, using the thickener for treating the large quantity of slurry in the aforementioned way results in an increase in facility cost.

Thus, for construction of a hydrometallurgy plant, a land having a shape like a valley and having an area substantially the same as a production area is selected at the design stage. The exit of the valley is subjected to a process for damming up to construct a tailings dam. Further, a metallurgy facility is constructed adjacent to the tailings dam. Slurry discharged from the metallurgy facility is treated in the tailings dam.

The tailings dam is to deposit a solid in slurry by means of only gravitational settling. This requires the slurry to stay in the tailings dam for a sufficient period of time. Thus, an overflow system applied, for example, in a thickener cannot be employed for discharge of supernatant water in the tailings dam. A pump is used for discharge of supernatant water from the tailings dam to the return water pond.

However, discharging supernatant water in the tailings dam using a pump causes the following problems.

A solid in slurry is deposited on the bottom of the dam gradually, which means that a deposition height increases gradually. As the sediment gets close to an inlet of the pump, the solid is sucked into the pump, causing a failure of the pump. Additionally, the water level of the tailings dam is always changed by the quantity of water discharged. If the water level drops to expose the inlet of the pump from a liquid surface, the pump is placed in an air sucking condition of sucking air into the pump which causes a failure of the pump.

To avoid these problems, laborious and time-consuming work of always monitoring the water level of the tailings dam and the deposition height in the tailings dam and changing the position of the inlet in response to changes in the water level and the deposition height must be carried out.

Additionally, because the tailings dam and the return water pond are constructed outside, they are largely affected by change in weather conditions. During torrential rain (severe rain hard to predict by a weather forecast) that occurs frequently in a rainy season in a region having a rainy season and a dry season and also occurrs mainly in summer in Japan, rainfall of hundreds of millimeters per hour continues for several hours. The occurrence of this severe rain increases the water level of the return water pond to cause overflow from the return water pond. This causes the risk of a surrounding facility being flooded.

Patent literature 1 discloses a technique of making a submersible pump move down to follow a drop in a water level by providing a floating member to the submersible pump. The submersible pump follows a water level, so that the height of the submersible pump can be adjusted accurately.

However, this technique does not take overflow from the return water pond constructed outside that is caused by severe rain into consideration.

PRIOR ART LITERATURE

Patent Literature

Patent Literature 1: Japanese Patent Application Publication No. 2000-009039

SUMMARY OF INVENTION

Problem to be Solved by Invention

In view of the aforementioned circumstances, this invention is intended to provide a supernatant water discharge device capable of preventing overflow from a settling pond due to severe rain.

This invention is also intended to provide a supernatant water discharge device capable of preventing failure of a pump due to suction of a solid or air.

Means of Solving Problem

A supernatant water discharge device according to a first invention is a supernatant water discharge device that discharges supernatant water in a first settling pond to a second settling pond. The supernatant water discharge device comprises: a submersible pump provided in the first settling pond; a weather observation unit including one or more of an anemometer, a hygrometer, a thermometer, and a hyetometer; a controller that stops the submersible pump if a measured value from the weather observation unit reaches a weather threshold; and a floating member that makes the submersible pump float in the first settling pond in such a manner that an inlet of the submersible pump is placed below the water surface of the first settling pond. The weather observation unit is provided to a part of the submersible pump above the water surface or to the floating member.

A supernatant water discharge device according to a second invention is characterized in that, in the first invention, the supernatant water discharge device comprises a water level sensor that measures the water level of the second settling pond, and the controller stops the submersible pump if a measured value from the water level sensor reaches a water level threshold.

A supernatant water discharge device according to a third invention is characterized in that, in the first invention, the supernatant water discharge device comprises the floating member that makes the submersible pump float in the first settling pond in such a manner that the submersible pump is entirely placed below the water surface of the first settling pond. The weather observation unit is provided to the floating member.

A supernatant water discharge device according to a fourth invention is a supernatant water discharge device that discharges supernatant water in a first settling pond to a second settling pond. The supernatant water discharge device comprises: a submersible pump provided in the first settling pond; a weather observation unit including one or more of an anemometer, a hygrometer, a thermometer, and a hyetometer; a controller that stops the submersible pump if a measured value from the weather observation unit reaches a weather threshold; a floating member that makes the submersible pump float on the water surface of the first settling pond; and a distance sensor provided to the submersible pump. The distance sensor measures a distance to a sediment in the first settling pond. The controller stops the submersible pump if a measured value from the distance sensor reaches a distance threshold.

A supernatant water discharge device according to a fifth invention is characterized in that, in the fourth invention, the distance sensor is a non-contact sensor.

Advantageous Effects of Invention

According to the first invention, the submersible pump is stopped if a measured value from the weather observation unit reaches the weather threshold. Thus, by predicting severe rain, discharge of the supernatant water to the second settling pond can be stopped. This can prevent overflow from the second settling pond due to severe rain. Further, the weather observation unit and the submersible pump are integrated. This makes the weather observation unit easy to handle.

According to the second invention, the submersible pump is stopped if a measured value from the water level sensor reaches the water level threshold. Thus, the second settling pond can be placed in a state where a margin is allowed for increase in a water level at normal times. Hence, even if the water level of the second settling pond is increased due to severe rain, overflow from the second settling pond can be prevented.

According to the third invention, as the submersible pump is entirely placed below the water surface, temperature increase of the submersible pump due to exposure to direct sunlight can be suppressed. This can make failure of the submersible pump unlikely.

According to the fourth invention, the submersible pump is stopped if a measured value from the distance sensor reaches the distance threshold. Thus, if the sediment gets close to the submersible pump as a result of a drop in water level or increase in a deposition height, the submersible pump can be stopped. This can prevent failure of the submersible pump due to suction of a solid.

According to the fifth invention, using the non-contact distance sensor can measure a distance to considerably soft sediment accurately.

EMBODIMENT FOR CARRYING OUT INVENTION

An embodiment of this invention is described next by referring to the drawings.

<Hydrometallurgy>

Hydrometallurgy to obtain nickel-cobalt mixed sulfide from a nickel oxide ore is explained first.

High-temperature and pressure sulfuric acid leaching corresponding to high pressure acid leaching (HPAL) using sulfuric acid is known as a hydrometallurgy method to recover a valuable metal such as nickel or cobalt from a low-grade nickel oxide ore represented by a limonite ore, for example.

Figure 4:
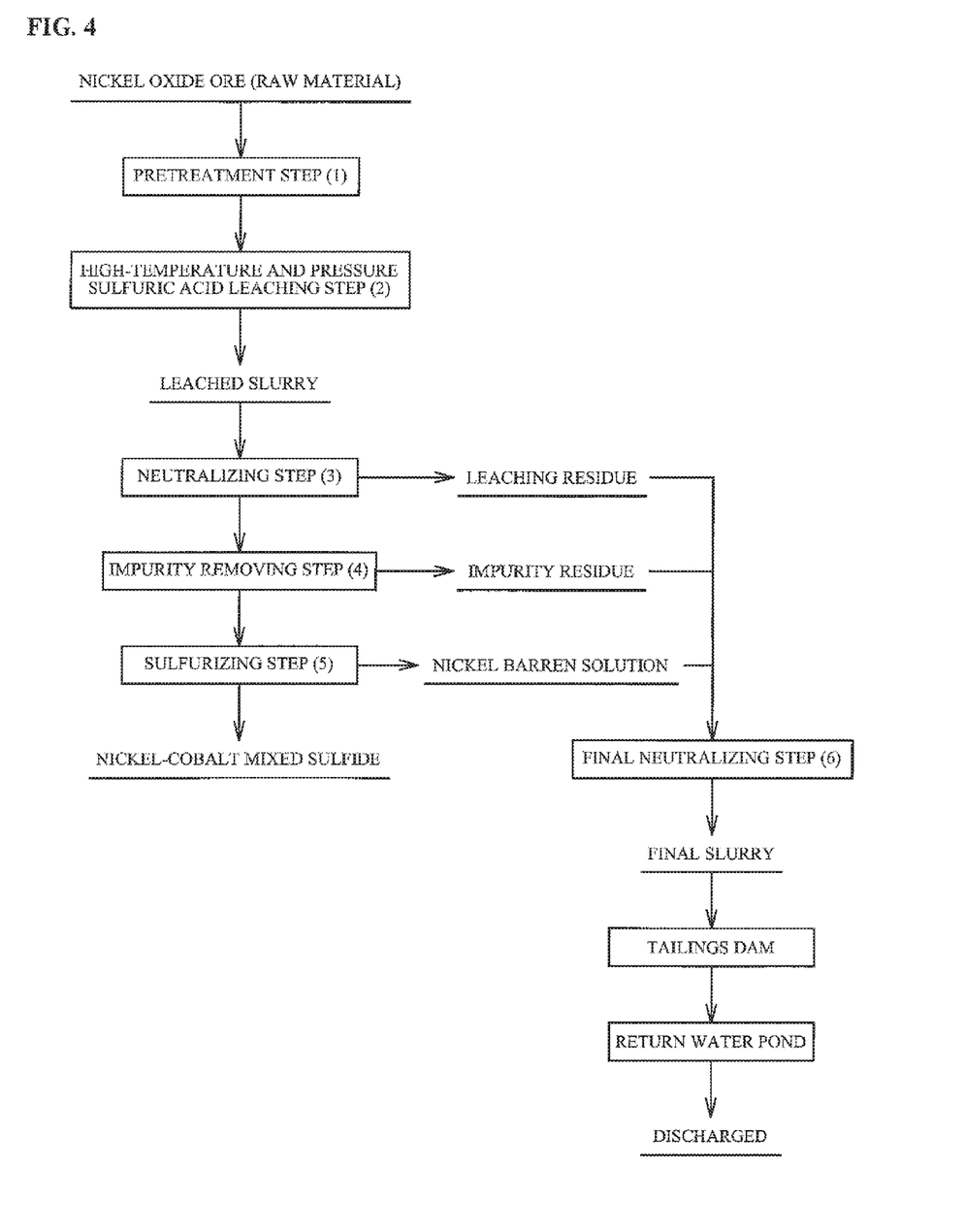
FIG. 4 shows an overall process of hydrometallurgy.

As shown in FIG. 4, hydrometallurgy employing high-temperature and pressure sulfuric acid leaching includes a pretreatment step (1), a high-temperature and pressure sulfuric acid leaching step (2), a neutralizing step (3), an impurity removing step (4), a sulfurizing step (5), and a final neutralizing step (6).

In the pretreatment step (1), the nickel oxide ore is crushed and sized to manufacture ore slurry. In the high-temperature and pressure sulfuric acid leaching step (2), sulfuric acid is added to the ore slurry obtained in the pretreatment step (1). Then, the ore slurry is agitated at a temperature from 220 to 280° C. for high-temperature and pressure acid leaching, thereby obtaining leached slurry.

In the neutralizing step (3), the leached slurry is neutralized and a leaching residue is discharged. In the impurity removing step (4), hydrogen sulfide gas is added to a leachate obtained in the neutralizing step (3) to remove zinc as a precipitate of zinc sulfide, for example, thereby discharging impurity as an impurity residue. In the sulfurizing step (5), a sulfurizing agent is added to a leachate after the impurity removal obtained in the impurity removing step (4). As a result, nickel-cobalt mixed sulfide is obtained and nickel barren solution is discharged.

Slurry containing a mixture of the leaching residue discharged in the neutralizing step (3), the impurity residue discharged in the impurity removing step (4), and the nickel barren solution discharged in the sulfurizing step (5) is charged to the final neutralizing step (6). In the final neutralizing step (6), the slurry is neutralized and discharged as final slurry.

The final slurry discharged as a result of the final neutralizing step (6) is separated into a solid and a liquid in a tailings dam. In the tailings dam, the solid in the final slurry settles out using gravity and is then deposited on the bottom of the dam. Supernatant water in the tailings dam is discharged to a return water pond, placed at a standstill therein, and then discharged to the outside of a system. The water discharged from the return water pond is returned as recycle water to hydrometallurgy or released.

<Tailings Dam and Return Water Pond>

A tailings dam and a return water pond are explained next.

Figure 1:
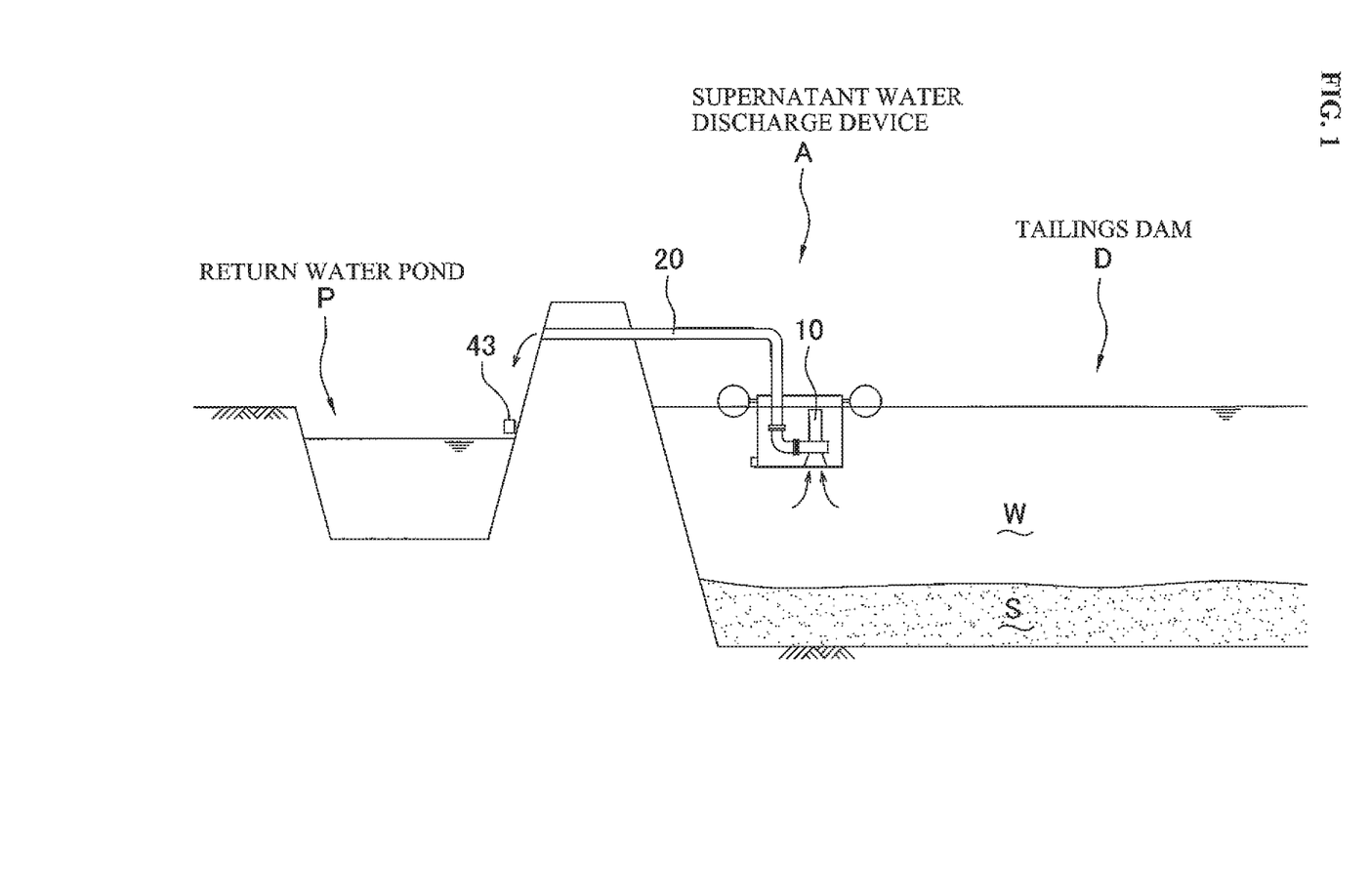
FIG. 1 illustrates a tailings dam and a return water pond.

As shown in FIG. 1, a tailings dam D (also called a slag dam) is a large-scale settling pond constructed by processing the exit of a valley-like shape of a land for damming up. Slurry (final slurry shown in FIG. 4) discharged from a metallurgy facility is first treated in the tailings dam D. In the tailings dam D, a solid in the slurry settles out using gravity and is then deposited on the bottom of the dam, thereby separating the slurry into a solid and a liquid, specifically, into a sediment S and supernatant water W. The sediment S deposited on the bottom of the dam is not discharged, so that the height of the sediment S (deposition height) increases gradually. Further, the water level of the tailings dam D is always changed by the quantity of water discharged (the quantity of slurry supplied to the tailings dam D and the quantity of supernatant water discharged from the tailings dam D).

The supernatant water W in the tailings dam D is discharged by a supernatant water discharge device A and is supplied to a return water pond P. The return water pond P (also called a still pond) is a settling pond constructed outside. The supernatant water W is placed at a standstill in the return water pond P and then discharged to the outside of the system.

The tailings dam D and the return water pond P correspond to a "first settling pond" and a "second settling pond" respectively recited in CLAIMS. The first and second settling ponds are not limited to the tailings dam D and the return water pond P; they can be any settling ponds for separation into a solid and a liquid by precipitation of the solid by means of settling out using gravity.

<Supernatant Water Discharge Device>

A supernatant water discharge device A according to the embodiment of this invention is applied preferably for the aforementioned discharge of the supernatant water W in the tailings dam D to the return water pond P.

As shown in FIG. 1, the supernatant water discharge device A includes a submersible pump 10 provided in the tailings dam D and a flexible hose 20 connected to the submersible pump 10. The supernatant water W sucked into the submersible pump 10 is guided through the flexible hose 20, discharged to the outside of the tailings dam D, and then supplied to the return water pond P.

As will be described later, the submersible pump 10 moves up and down to follow the water level of the tailings dam D. To allow the submersible pump 10 to move up and down, the flexible hose 20 is made of a material having flexibility such as rigid vinyl.

Figure 2:
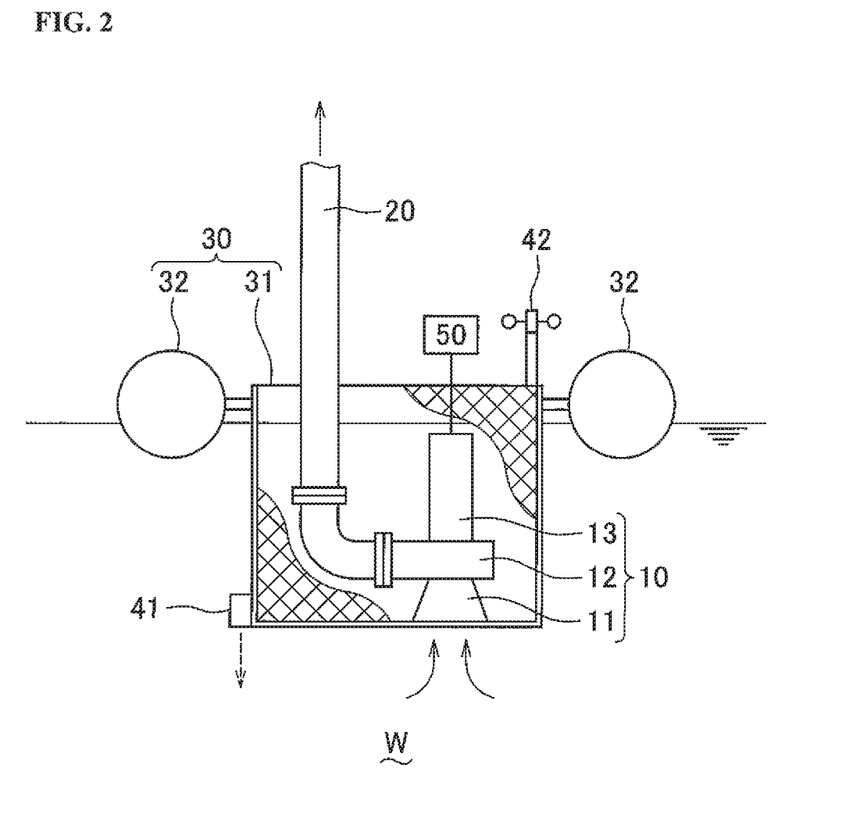
FIG. 2 illustrates a supernatant water discharge device according to an embodiment of this invention.

As shown in FIG. 2, the submersible pump 10 is formed of an inlet 11, a delivery pipe 12, and a motor 13. By operating the motor 13, the supernatant water W can be sucked through the inlet 11 and discharged from the delivery pipe 12. The delivery pipe 12 is connected to one end of the flexible hose 20 through a connection pipe 21.

(Floating Member)

The submersible pump 10 is provided with a floating member 30 and floats on the water surface of the tailings dam D. The floating member 30 is formed of a housing 31 accommodating the submersible pump 10 and a float 32 fixed to the housing 31. The housing 31 is made of a material such as wire mesh that allows a liquid to flow into the housing 31. The housing 31 is configured to receive the supernatant water W flowing into the inside of the housing 31. The float 32 is not particularly limited as long as the float 32 can achieve intended buoyant force. The float 32 is made of expandable polystyrene or a metal can, for example. The shape of the float 32 is not particularly limited. The float 32 may have a columnar or spherical shape, for example.

The buoyant force of the floating member 30 is required only to make the submersible pump 10 float in such a manner that at least the inlet 11 is placed below the water surface. Placing the inlet 11 below the water surface allows suction of the supernatant water W.

Like in this embodiment, it is preferable that the floating member 30 be configured to float in such a manner that the submersible pump 10 is entirely placed directly below the water surface because the tailings dam D is placed outside and the submersible pump 10 is exposed to sunlight accordingly. In this regard, configuring the floating member 30 in this way makes the submersible pump 10 stay under water. This can suppress temperature increase of the submersible pump 10 due to exposure to direct sunlight and water-cool the submersible pump 10. As a result, failure of the submersible pump 10 can become unlikely. Further, even during the occurrence of an unexpected overheating phenomenon at the submersible pump 10, water-cooling the submersible pump 10 can still make failure of the submersible pump 10 unlikely.

As described above, the water level of the tailings dam D is always changed by the quantity of water discharged. In this regard, by making the submersible pump 10 float on the water surface of the tailings dam D using the floating member 30, the submersible pump 10 moves up and down to follow the water level of the tailings dam D. This prevents the inlet 11 from being exposed from a liquid surface, so that failure of the submersible pump 10 due to suction of air can be avoided.

(Distance Sensor)

A distance sensor 41 is fixed to the housing 31 of the floating member 30 in a place near the bottom of the housing 31. Specifically, the distance sensor 41 is fixed to the submersible pump 10 through the floating member 30 and moves up and down together with the submersible pump 10. The phrase "being provided to the submersible pump" recited in CLAIMS includes a way of providing the distance sensor 41 to the submersible pump 10 directly and a way of providing the distance sensor 41 to the submersible pump 10 indirectly through a different member such as the floating member 30.

The distance sensor 41 is configured in a manner such that the distance sensor 41 makes measurement in a downward direction and can measure a distance to the sediment S deposited on the bottom of the tailings dam D. Thus, a distance between the submersible pump 10 and the sediment S can be measured using the distance sensor 41.

The type of the distance sensor 41 is not particularly limited as long as the distance sensor 41 can measure a distance to the sediment S. The distance sensor 41 may be a non-contact sensor such as an optical sensor or an acoustic wave sensor. Alternatively, the distance sensor 41 may be a contact sensor. However, it is preferable that the distance sensor 41 be a non-contact sensor for the following reason. According to hydrometallurgy using a low-grade nickel oxide ore as a raw material, the sediment S resulting from deposition of a solid in discharged slurry is a considerably fine clayey object so the surface of the sediment S is considerably soft. Using a non-contact distance sensor 41 makes it possible to measure a distance to the considerably soft sediment S accurately.

A controller 50 is connected to the submersible pump 10, so that on and off state of the motor 13, specifically, operation and stop of the submersible pump 10 can be controlled. The controller 50 and the distance sensor 41 are connected with or without a wire. A measured value from the distance sensor 41 is input to the controller 50.

The controller 50 stores a lower limit of a distance between the submersible pump 10 and the sediment S (distance threshold). If a measured value from the distance sensor 41 reaches the distance threshold (or becomes lower than the distance threshold), the controller 50 stops the submersible pump 10. Thus, the submersible pump 10 can be stopped if the submersible pump 10 gets too close to the sediment S.

As described above, the water level of the tailings dam D is always changed and the submersible pump 10 moves up and down to follow the water level of the tailings dam D. Further, the height of the sediment S (deposition height) deposited on the bottom of the tailings dam D increases gradually. Thus, if the submersible pump 10 gets too close to the sediment S as a result of a drop in the water level or increase in the deposition height, a solid is sucked into the submersible pump 10 to cause failure of the submersible pump 10.

In this regard, the submersible pump 10 is stopped if a measured value from the distance sensor 41 reaches the distance threshold. Thus, if the sediment S gets close to the submersible pump 10 as a result of a drop in the water level or increase in the deposition height, the submersible pump 10 can be stopped. This can prevent failure of the submersible pump 10 due to suction of a solid.

The distance threshold is set at a distance sufficient for preventing suction of a solid into the submersible pump 10. For example, the distance threshold may be a distance from the inlet 11 of the submersible pump 10 to the sediment S set at 30 cm.

If a measured value from the distance sensor 41 exceeds the distance threshold, the controller 50 operates the submersible pump 10.

(Weather Observation Unit)

An anemometer 42 is provided to an upper part of the housing 31 of the floating member 30. Specifically, the anemometer 42 is provided to the submersible pump 10 through the floating member 30. The phrase "being provided to the submersible pump" recited in CLAIMS includes a way of providing the anemometer 42 to the submersible pump 10 directly and a way of providing the anemometer 42 to the submersible pump 10 indirectly through a different member such as the floating member 30.

Wind speed (wind power) around the submersible pump 10 can be measured using the anemometer 42. Increase in a wind speed can be regarded as a predictor of the occurrence of severe rain in a peripheral region of the tailings dam D and the return water pond P. The occurrence of severe rain increases wind speed. Thus, the occurrence of severe rain can be predicted using the anemometer 42.

The controller 50 and the anemometer 42 are connected with or without a wire. A measured value from the anemometer 42 is input to the controller 50. The controller 50 stores an upper limit of wind speed (wind speed threshold). If a measured value from the anemometer 42 reaches the wind speed threshold (or becomes larger than the wind speed threshold), the controller 50 stops the submersible pump 10. Thus, the submersible pump 10 can be stopped in advance if severe rain is predicted.

The tailings dam D and the return water pond P are constructed outside. Thus, on the occurrence of severe rain, rainwater flows into the tailings dam D and the return water pond P to increase their water levels. In particular, the return water pond P is managed while being kept at a high water level with the intention of making water stay in the return water pond P as long as possible. Thus, increase in the water level of the return water pond P due to severe rain causes the risk of a surrounding facility being flooded.

In this regard, the submersible pump 10 is stopped if a measured value from the anemometer 42 reaches the wind speed threshold. Thus, by predicting severe rain, discharge of the supernatant water W to the return water pond P can be stopped. This can prevent overflow from the return water pond P due to severe rain.

The wind speed threshold is set at the wind power considered to blow during the occurrence of severe rain. For example, the wind speed threshold is set at 15 m/s.

If a measured value from the anemometer 42 falls below the wind speed threshold, the controller 50 operates the submersible pump 10.

The anemometer 42 and the wind speed threshold correspond to a "weather observation unit" and a "weather threshold" respectively recited in CLAIMS. A unit applicable as the weather observation unit includes not only the anemometer 42 but also a hygrometer, a thermometer, a hyetometer, etc.

If a hygrometer is used as the weather observation unit, humidity increase is used as a predictor of the occurrence of severe rain. In this case, the controller 50 stores an upper limit of humidity (humidity threshold). If a measured value from the hygrometer reaches the humidity threshold (or becomes larger than the humidity threshold), the controller 50 stops the submersible pump 10.

If a thermometer is used as the weather observation unit, temperature drop is used as a predictor of the occurrence of severe rain. In this case, the controller 50 stores a lower limit of temperature (temperature threshold). If a measured value from the thermometer reaches the temperature threshold (or becomes lower than the temperature threshold), the controller 50 stops the submersible pump 10.

If a hyetometer is used as the weather observation unit, rapid increase in rainfall is used as a criterion of severe rain. In this case, the controller 50 stores an upper limit of rainfall (rainfall threshold). If a measured value from the hyetometer reaches the rainfall threshold (or becomes larger than the rainfall threshold), the controller 50 stops the submersible pump 10.

Each of the anemometer 42, hygrometer, thermometer, and hyetometer can be used alone as the weather observation unit. Alternatively, two or more of these units can be used in combination.

The weather observation unit can be located in any position near the tailings dam D or the return water pond P. For example, the weather observation unit may be placed at an embankment of the tailings dam D. Providing the weather observation unit to the submersible pump 10 like in this embodiment integrates the weather observation unit and the submersible pump 10. This makes the weather observation unit easy to handle. However, if the weather observation unit is to be provided to the submersible pump 10, it is preferable that the anemometer 42 be used as the weather observation unit as placing a hygrometer, a thermometer, or a hyetometer near a water surface causes the risk of malfunction of the unit.

(Water Level Sensor)

As shown in FIG. 1, a water level sensor 43 that measures the water level of the return water pond P is provided in the return water pond P. The type of the water level sensor 43 is not particularly limited as long as the water level sensor 43 can measure the water level of the return water pond P.

The controller 50 and the water level sensor 43 are connected with or without a wire. A measured value from the water level sensor 43 is input to the controller 50. The controller 50 stores an upper limit of the water level of the return water pond P (water level upper limit). The "water level upper limit" corresponds to a "water level threshold" recited in CLAIMS. If a measured value from the water level sensor 43 reaches the water level upper limit (or becomes larger than the water level upper limit), the controller 50 stops the submersible pump 10.

By determining the water level upper limit to be lower than a water level at the upper end of the return water pond P (upper limit that causes overflow of water if exceeded), the return water pond P can be managed while a margin is allowed for increase in water level.

As described above, on the occurrence of severe rain, rainwater flows into the return water pond P to increase its water level, thereby causing the risk of overflow of water. In this regard, the submersible pump 10 is stopped if a measured value from the water level sensor 43 reaches the water level upper limit. In this way, the return water pond P can be placed in a state where a margin is allowed for increase in a water level at normal times (in a normal weather condition). Hence, even if the water level of the return water pond P is increased due to severe rain, overflow from the return water pond P can be prevented.

If a peak rainfall of 250 mm/h is assumed to continue for four hours at a maximum on the occurrence of severe rain, for example, maximum water level increase is assumed to be 1 m. In this case, the water level upper limit is set at a water level lower by the maximum water level increase (1 m) than the water level at the upper end of the return water pond P (upper limit that causes overflow of water if exceeded). By doing so, the water level of the return water pond P is maintained at a level that produces a margin from the upper end of the return water pond P at normal times. This can prevent overflow of water from the return water pond P even if its water level increases on the occurrence of severe rain.

The operation of the submersible pump 10 at rest can be restarted by storing a lower limit of the water level of the return water pond P (water level lower limit) in the controller 50 and operating the submersible pump 10 if a measured value from the water level sensor 43 reaches the water level lower limit (or becomes lower than the water level lower limit).

The water level lower limit is set at a level lower than the water level upper limit. Further, to make water stay in the return water pond P for a longer period of time, the water level lower limit is set at a level as high as possible. By setting the water level upper limit and the water level lower limit in this way, the water level of the return water pond P can be maintained between the water level upper limit and the water level lower limit. Respective settings of the water level upper limit and the water level lower limit are not particularly limited. The water level upper limit and the water level lower limit may be determined in consideration of the scale of the tailings dam D or the return water pond P or the climate of a peripheral region of the tailings dam D and the return water pond P. For example, the water level upper limit and the water level lower limit may be set at 90% and 80% of the capacity of the return water pond P, respectively.

(Controller)

Figure 3:
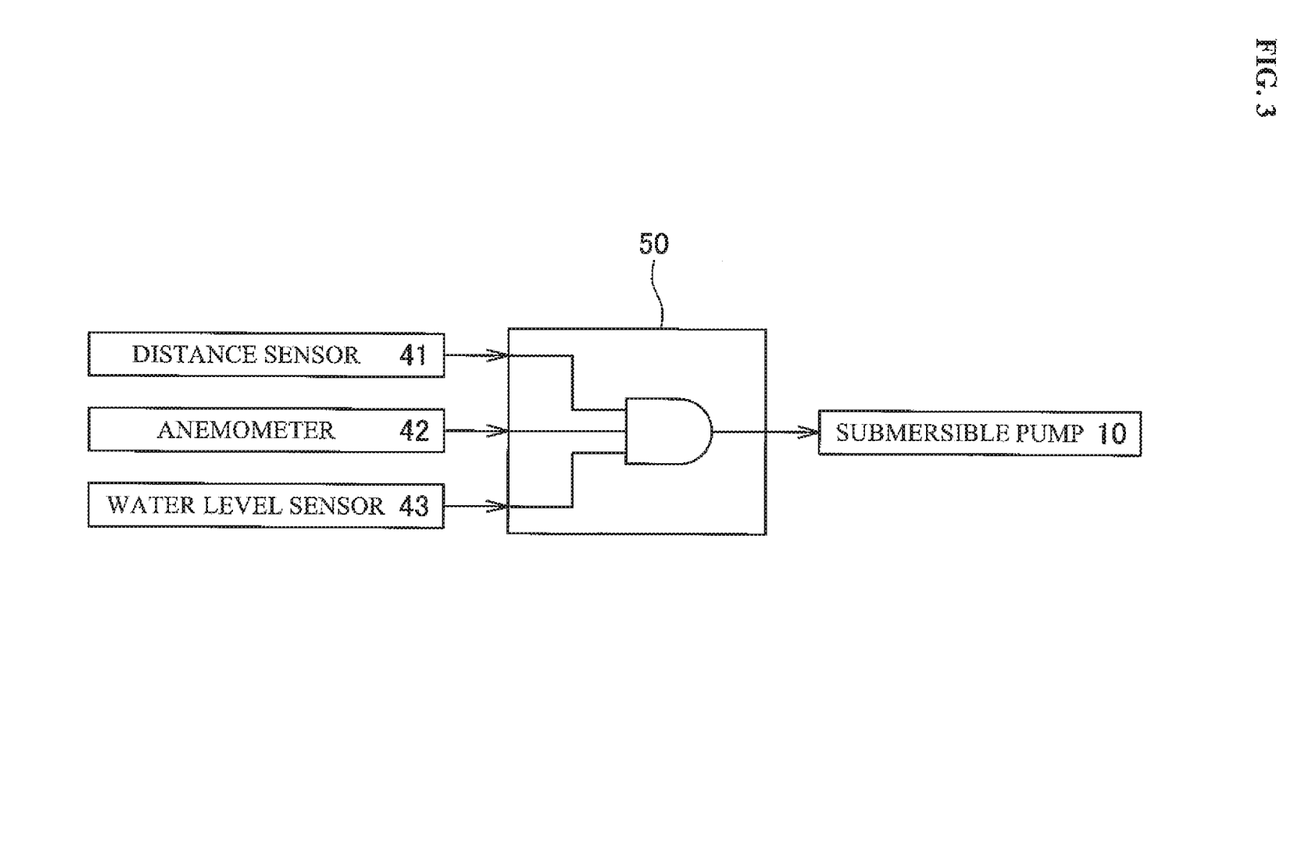
FIG. 3 is a block diagram of a controller.

As described above, the controller 50 controls operation and stop of the submersible pump 10 based on a measured value from each of the distance sensor 41, the anemometer 42, and the water level sensor 43. The controller 50 is formed of an electronic circuit such as a CPU, for example. The controller 50 includes an input unit for input from each of the sensors 41, 42, and 43, and an output unit for output to the submersible pump 10.

As shown in FIG. 3, the controller 50 receives a measured value input from each of the distance sensor 41, the anemometer 42, and the water level sensor 43. The controller 50 operates the submersible pump 10 if the respective measured values from the distance sensor 41, the anemometer 42, and the water level sensor 43 all indicate that the submersible pump 10 may be operated. The controller 50 stops the submersible pump 10 if any of the respective measured values from the distance sensor 41, the anemometer 42, and the water level sensor 43 indicate that the submersible pump 10 should be stopped. Specifically, the controller 50 controls operation and stop of the submersible pump 10 in response to a result of an AND operation. Configuring the controller 50 in this way can prevent failure of the pump due to suction of a solid or air and overflow from the return water pond P due to severe rain.

REFERENCE SINGS LIST

D Tailings dam
P Return water pond
A Supernatant water discharge device
10 Submersible pump
11 Inlet
12 Delivery pipe
13 Motor
20 Flexible hose
21 Connection pipe
30 Floating member
31 Housing
32 Float
41 Distance sensor
42 Anemometer
43 Water level sensor
50 Controller

The invention claimed is:

1. A supernatant water discharge device that discharges supernatant water in a first settling pond to a second settling pond, the supernatant water discharge device comprising:
    a submersible pump provided in the first settling pond, wherein the submersible pump discharges supernatant water in the first settling pond to the second settling pond;
    a weather observation unit including one or more of an anemometer, a hygrometer, and a hyetometer;
    a controller that stops the submersible pump if a measured value from the weather observation unit reaches a weather threshold;
    a floating member that makes the submersible pump float on the water surface of the first settling pond; and
    a distance sensor attached to the submersible pump, the distance sensor measuring a distance from the submersible pump to a sediment in the first settling pond,
    wherein the controller stops the submersible pump if a measured value from the distance sensor reaches a distance threshold,
    wherein the weather observation unit and the submersible pump are integrated, and the weather observation unit detects a weather condition at a location spaced apart from the first settling pond.

2. The supernatant water discharge device according to claim 1, wherein the distance sensor is a non-contact sensor.

3. A supernatant water discharge device, comprising:
a submersible pump provided in a first settling pond, configured to pump supernatant water from the first settling pond to a second settling pond;
a weather observation unit including two or more of an anemometer, a hygrometer, and a hyetometer;
a controller that stops the submersible pump if a measured value from the weather observation unit reaches a weather threshold;
a floating member that makes the submersible pump float on the surface of the first settling pond; and
a distance sensor attached to the submersible pump, the distance sensor measuring a distance from the submersible pump to a sediment in the first settling pond,
wherein the height of the sediment changes,
wherein the controller stops the submersible pump if a measured value from the distance sensor reaches a distance threshold,
wherein the weather observation unit and the submersible pump are integrated, and the weather observation unit detects a weather condition at a location spaced apart from the first settling pond.

* * * * *